July 28, 1931. W. C. STEVENS 1,816,501
SEPARABLE FASTENER
Filed Oct. 2, 1925
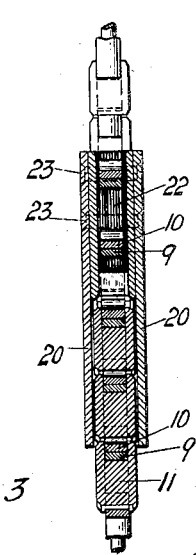
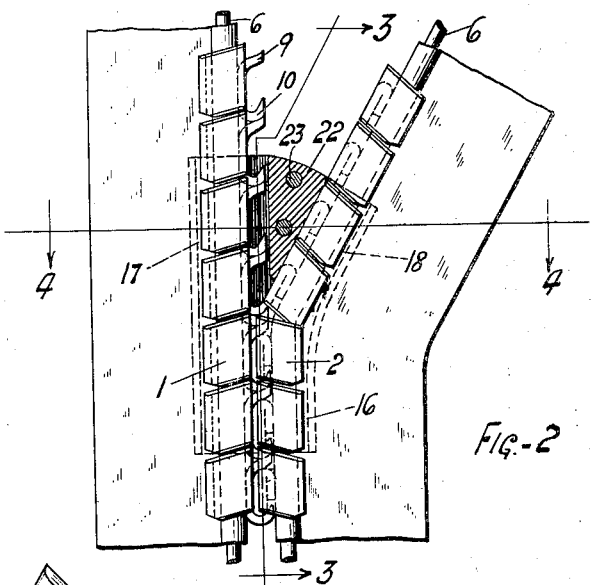
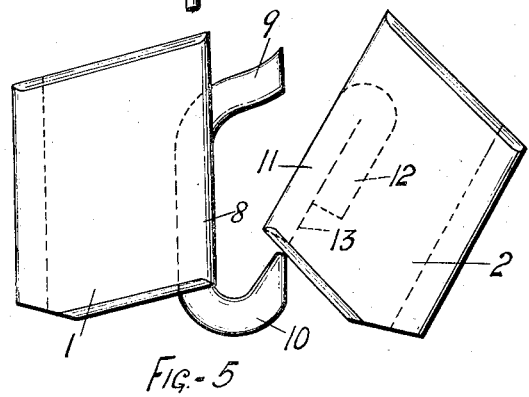
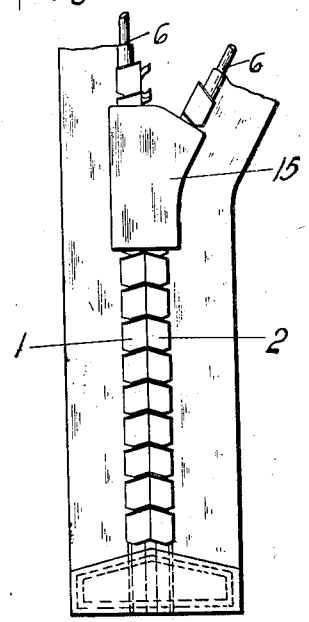
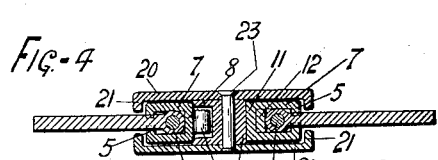
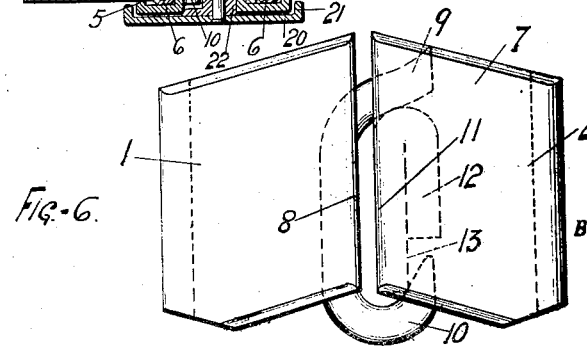
INVENTOR.
WILLIAM C. STEVENS.
BY
ATTORNEY.

Patented July 28, 1931

1,816,501

UNITED STATES PATENT OFFICE

WILLIAM C. STEVENS, OF AKRON, OHIO, ASSIGNOR, BY MESNE ASSIGNMENTS, TO FIRESTONE FOOTWEAR COMPANY, OF BOSTON, MASSACHUSETTS, A CORPORATION OF MASSACHUSETTS

SEPARABLE FASTENER

Application filed October 2, 1925. Serial No. 60,033.

This invention relates to that type of separable fastener in which the meeting edges of the closure for a boot, gaiter, bag, pouch, or other article are provided with rows of metallic fasteners which are adapted to be brought into interlocking engagement by a follower or movable slide, and to be unfastened by a reverse movement of the follower or slide.

Fastening devices of this general type have been known for a very considerable time, but it is the object of my invention to improve upon them and construct a neater and more efficient fastener than prior types. In addition, the fastener of my invention is sturdy and certain in its operation, cannot be easily injured and may be manufactured at a low figure.

Other objects and advantages other than those stated will be apparent from a further description and understanding of the device which is here shown and described, it being understood that changes and modifications may be made within the scope of the invention as set forth in the claims.

Figure 1 is a front view of the separable fastener showing a portion thereof closed and a portion opened;

Figure 2 is an enlarged view taken at the point where the fasteners join, the upper portion of the slide being removed to show the manner in which the fasteners come together;

Figure 3 is a section on the line 3—3 of Figure 2;

Figure 4 is a section on the line 4—4 of Figure 2; and

Figures 5 and 6 are enlarged views of individual units about to mate, and in mating position.

In the device as illustrated, the fastener comprises rows of male and female members arranged on opposite sides of the closure and adapted to be brought together by a slide or follower when moving in one direction and separated when moved in the opposite direction. The device may be applied to gaiters, pouches, dresses, or other articles.

In the drawings, the male or hook members are indicated by the numeral 1 and the female or socket members by the numeral 2, these members being arranged upon opposite sides of the closure and being secured thereon in any suitable manner. In the forms shown, the hook and socket members are formed with flanges 5 which are crimped over an edging or tape 6 upon the edges of the closure, the flanges being formed on the edges of parallel webs 7 which form the body of each member. While the adjacent members are secured on the edges of the closure in close relationship, the securing flanges 5 of adjacent members are spaced apart by virtue of a cut away corner 5ª permitting flexibility of the fastener.

The outer edge of the male member is formed with a wall 8, a portion of which is cut or sheared down into the body of the member, the cut portion or tongue being bent upwardly to form a hook or horn 9 which is angularly arranged with respect to the body and may be slightly curved as indicated. A tongue of metal protrudes below the body of the fastener and is bent upwardly to form a second hook or horn 10 which is slightly converged with respect to the hook 9.

When the row of members 1 is secured upon the edge of the closure, it will be observed that each horn 10 lies within the opening created by the formation of the horn 9 on the next adjacent fastener which prevents the spreading of the fastener at the joints while permitting a sufficient degree of flexibility. It will also be observed that each hook 10 overlies the hook 9 on the next adjacent fastener, thereby serving to maintain the hook 9 from accidental disengagement from the socket or female member.

The outer wall 11 of each female member 2 is cut back at a point opposite the hook 9 and the metal is bent backwardly against the inside surface of the wall, as at 12, leaving an exposed ledge 13.

When the parts are mated, as shown in Figures 5 and 6, the hook or prong 10 on the male member passes between the webs 7 and back of the ledge 13, while the hook or prong 9 enters the space created by stamping out the tongue 12. The manner in which the two members mate is shown in Figure 5 and their mated or nested position is shown in Figure 6, it being further observed that the rounded portion of the prong 10 also enters partially into the slot on the next adjacent female member as well.

The fastener operates quickly and easily and is secure as well as flexible throughout. The device cannot become unfastened when the parts have been engaged.

In order to bring the members of the fastener together and separate them, a movable slider or follower is employed, which is similar to the usual form of slider, being of substantially Y-shape with a single and two diverging channels, differing from the usual slider, however, in that one of the diverging channels is a continuation of the main channel so that one of the rows of elements is always in a straight line.

The slider is indicated by the numeral 15 and comprises a main channel 16 through which the connected fastener passes and two diverging channels 17 and 18 for the male and female members of the device, respectively, the channel 17 being a continuation of the main channel and the channel 18 passing off at an angle thereto, an arrangement which is necessitated by the character of the device.

The slider is composed of upper and lower plates 20 which are formed with flanges 21 which embrace the fasteners and upon which the slide is guided. The two plates are spaced apart by a pointed plate or wedge member 22 which enters the space between the members, the whole device being assembled by transverse rivets 23. The side of the wedge piece 22 toward the male members of the fastener is provided with a narrow channel through which the hooks pass, serving to maintain the hooks in proper alignment just before the fastener elements meet.

The operation of bringing the two members of the fastener together or in nested relation is clearly shown in Figure 5, and it is believed that the operation of the device will be clearly understood from the description which has been given. An important feature of the construction is that the prongs of the hook members are at such an angle to the members as to extend in the same general direction as the actuating channel of the slider for the female members, whereby the female members are easily flexed onto or off the prongs by movement of the slider in one direction or the other.

Various changes and modifications will suggest themselves to one skilled in the art to which this appertains and such modifications as fall within the true scope of the invention are intended to be covered herein.

What is claimed is:

1. In a separable fastener, rows of fastening elements attached to opposite sides of a closure, one of said rows consisting of hooks members and the other row consisting of socket members, each hook member having spaced, slightly convergent, angularly arranged prongs, and each socket member being adapted to receive both of said prongs.

2. In a separable fastener, rows of fastening elements attached to opposite sides of a closure, one of said rows consisting of hook members and the other row consisting of socket members, each hook member having spaced, slightly convergent prongs, and each socket member being adapted to receive both said prongs and having a wall lying between the said prongs when the fastener is closed.

3. In a separable fastener, rows of fastening elements attached to opposite sides of a closure, one of said rows consisting of hook members and the other row consisting of socket members, each hook member having spaced, slightly convergent prongs arranged angularly with respect to the body of said member, and each socket member being adapted to receive both said prongs and having a wall which may be inserted between said prongs angularly, one of said prongs passing behind the wall.

4. In a separable fastener, rows of fastening elements attached to opposite sides of a closure, one of said rows consisting of hook members and the other row consisting of socket members, each hook member having two outwardly projecting, spaced prongs, and each socket member having openings to receive both of said prongs and having a portion adapted to nest within the space between said prongs.

5. In a separable fastener, rows of fastening elements attached to opposite sides of a closure, one of said rows consisting of hook members, each having a prong projecting outwardly therefrom and each being formed with a recess in the end thereof, and the other of said rows consisting of socket members each having a wall behind which the prong passes, the base of the prong on one hook member being receivable within the recess in the next adjacent hook member and the free end of the prong projecting outwardly from said recess.

6. In a separable fastener, rows of fastening elements attached to opposite sides of a closure, one of said rows consisting of hook members, each having a prong projecting outwardly therefrom, and the other of said rows consisting of socket members each being formed with a recess and each having a wall behind which the prong passes, the body of said prong being receivable within the recess in the next adjacent socket member.

7. In a separable fastener, rows of fastening elements attached to opposite sides of a closure, one of said rows consisting of hook members, each having a prong extending outwardly therefrom and each having a recess therein, and the other of said rows consisting of socket members each having a recess and each having a wall behind which the point of the prong passes the body of the prong being received within the recesses in the next adjacent hook and socket members.

8. In a separable fastener, a plurality of hook members and a plurality of socket members arranged in rows on opposite sides of a closure, and a slide for bringing said members into interlocking engagement, said slide having a straight channel for one of said rows and a diverging channel for the other row, the hooks extending from the hook members in the general direction of the divergence of the channels in the slide the said channels being adapted to nest the hook and socket members.

9. In a separable fastener, a plurality of male members, each of said male members being formed with hooks, and a plurality of socket members arranged in rows on opposite sides of a closure, and a slide for bringing said members into interlocking engagement, said slide having a channel for the male members and a diverging channel for the socket members, the hooks extending from the hook members in the general direction of the divergence of the channels in the slide, each socket member comprising a portion adapted to be nested between corresponding pairs of hooks on said male members by the operation of said slide.

10. In a separable fastener, including a slide having diverging channels, an element adapted to form one member of a couple, said element comprising a pair of slightly convergent prongs spaced apart upon the member and having their ends inclined angularly with respect to the body of the member and substantially in the direction of divergence of the channels.

11. In a separable fastener, an element adapted to form one member of a couple, said element comprising a metallic body portion and a tongue bent outwardly from the body of said element thereby forming a recess, and a second tongue extending outwardly of the body portion and adapted to lie within the said recess on the next adjacent member when a plurality of the said members are arranged in rows along the edge of a closure.

12. In a separable fastener, including co-operating rows of male elements and socket members arranged along the edges of a closure, each male element comprising a metallic body portion and a tongue bent outwardly from the body of said element, and a second tongue extending outwardly of the body portion and slightly convergent to the first named tongue, the two tongues being so formed that the first named tongue on one element will overlie the second named tongue on the next adjacent element in the row, the overlying tongues being adapted to cooperate with a socket member as a single male member.

13. In a separable fastener, an element adapted to form one member of a couple, said element comprising a metallic body portion and a tongue bent outwardly from the body of said element to form a prong and a recess in the body portion and a second tongue extending outwardly of the body portion and slightly convergent to the first named tongue, so that when a plurality of said members are arranged in rows along the edge of a closure the second named tongue will overlie the first named tongue on the next adjacent member on one side thereof, and the second named tongue will lie within the recess on the next adjacent member on the other side thereof.

14. In a separable fastener, an element adapted to form one member of a couple, said element comprising two parallel webs and an intermediate wall, a portion of the wall being recessed to form an unobstructed opening between the webs at one end of the member, the wall at the other end of said member constituting a ledge.

15. In a separable fastener, an element adapted to form one member of a couple, said element comprising two parallel webs and an intermediate wall, a portion of the wall being recessed to form an opening between the webs at one end of the member, the wall at the other end of said member constituting a ledge, and a hook member completing the couple and formed with prongs adapted respectively to enter said recess and pass behind said ledge.

16. A separable fastener comprising rows of fastening elements on the opposite sides of a closure, and a slide movable over said elements for operating the fastener, said slide having diverging channels, the elements of one row each having a pair of hooks extending therefrom toward the other row, the hooks all being turned in the general direction of divergence of the slide channels, each of the elements of the other row providing a wall adapted to extend between corresponding pairs of hooks when the fastener is closed and adapted to be rocked by the slide to move one end of each wall over the opposite hook.

17. A separable fastener comprising rows of fastening elements on the opposite sides of a closure, and a slide movable over said elements for operating the fastener, said slide having diverging channels, the elements of one row each having a pair of hooks extending therefrom toward the other row, the hooks all being turned in the general direction of divergence of the slide channels, the elements of the other row being formed with complementary notches cooperating to form apertures through which the hooks may extend, the latter elements being adapted to be rocked by the slide for separating the notched portions thereof to permit passing of the latter elements over the hooks.

18. In a separable fastener, a row of fastener elements on one side of a closure, said elements each having slightly convergent hook-like extending projections on the opposite ends thereof, adjacent projections on adjacent elements overlying each other in close relationship, a row of fastener elements on the other side of the closure, and the second named elements comprising webs adapted to extend between the projections on the first named elements, the second named elements being mounted so that they may be rocked into or away from closed position between said projections.

19. In a separable fastener including a slider having diverging channels, a series of elements, each adapted to form one member of a couple, a second series of elements, each adapted to form the second member of the couple, the two series of elements being secured to opposite sides of a closure, each member of the first-named series comprising a pair of slightly convergent prongs spaced apart upon the member and having their ends inclined angularly with respect to the body of the member and substantially in the direction of divergence of the channels, the upper prong being of greater extent than the lower prong and the upper and lower prongs cooperating with the members of the second series of elements as a single male member.

WILLIAM C. STEVENS.